United States Patent [19]

Kinney

[11] Patent Number: 4,756,657
[45] Date of Patent: Jul. 12, 1988

[54] STACKER BIN SHUTTLE

[75] Inventor: Thomas Kinney, Crete, Ill.

[73] Assignee: Interlake, Inc., Oak Brook, Ill.

[21] Appl. No.: 848,408

[22] Filed: Apr. 4, 1986

[51] Int. Cl.⁴ .............................................. B65G 65/00
[52] U.S. Cl. .................... 414/281; 414/280; 414/661
[58] Field of Search ............... 414/278, 279, 280, 281, 414/282, 659, 660, 661, 662, 663; 108/143

[56] References Cited

U.S. PATENT DOCUMENTS

| | | | |
|---|---|---|---|
| 3,237,789 | 3/1966 | Guilbert | 414/661 |
| 3,598,265 | 8/1971 | Aaronson et al. | 414/661 |
| 3,630,319 | 12/1971 | Peterson | 414/661 X |
| 3,664,534 | 5/1972 | Hunter | 414/659 |
| 3,809,259 | 5/1974 | Piper | 414/280 |
| 3,883,008 | 5/1975 | Castaldi | 414/280 X |
| 4,352,622 | 10/1982 | Wieschel | 414/661 X |
| 4,358,239 | 11/1982 | Dechantsreiter | 414/282 X |
| 4,382,741 | 5/1983 | Lunardi et al. | 414/281 X |
| 4,568,071 | 2/1986 | Rice | 108/143 X |

FOREIGN PATENT DOCUMENTS

| | | | |
|---|---|---|---|
| 1217874 | 5/1966 | Fed. Rep. of Germany | 414/281 |
| 2934619 | 3/1981 | Fed. Rep. of Germany | 414/281 |
| 48802 | 3/1985 | Japan | 414/281 |
| 1051879 | 12/1966 | United Kingdom | 414/281 |

Primary Examiner—Peter A. Aschenbrenner
Assistant Examiner—Thomas A. Rendos
Attorney, Agent, or Firm—Allegretti, Newitt, Witcoff & McAndrews, Ltd.

[57] ABSTRACT

A carriage is mounted for longitudinal movement on the elevator of a stacker crane and carries a rod adapted to engage the flange on the container drawer to move the drawer in and out of the storage rack. The rod is mounted on a pair of chains trained on sprockets at opposed sides of the carriage. Drive means is provided for moving the carriage back and forth into and out of contact with the storage rack at the level where the drawer enters the slot or bin in the rack. As the chains move on the sprockets, the extractor rod engages the flange on the drawer and, depending upon the direction the chains are moving, either pulls the drawer out or pushes it into its slot. The container drawer slides on suitable supports in the rack and on the carriage.

9 Claims, 4 Drawing Sheets

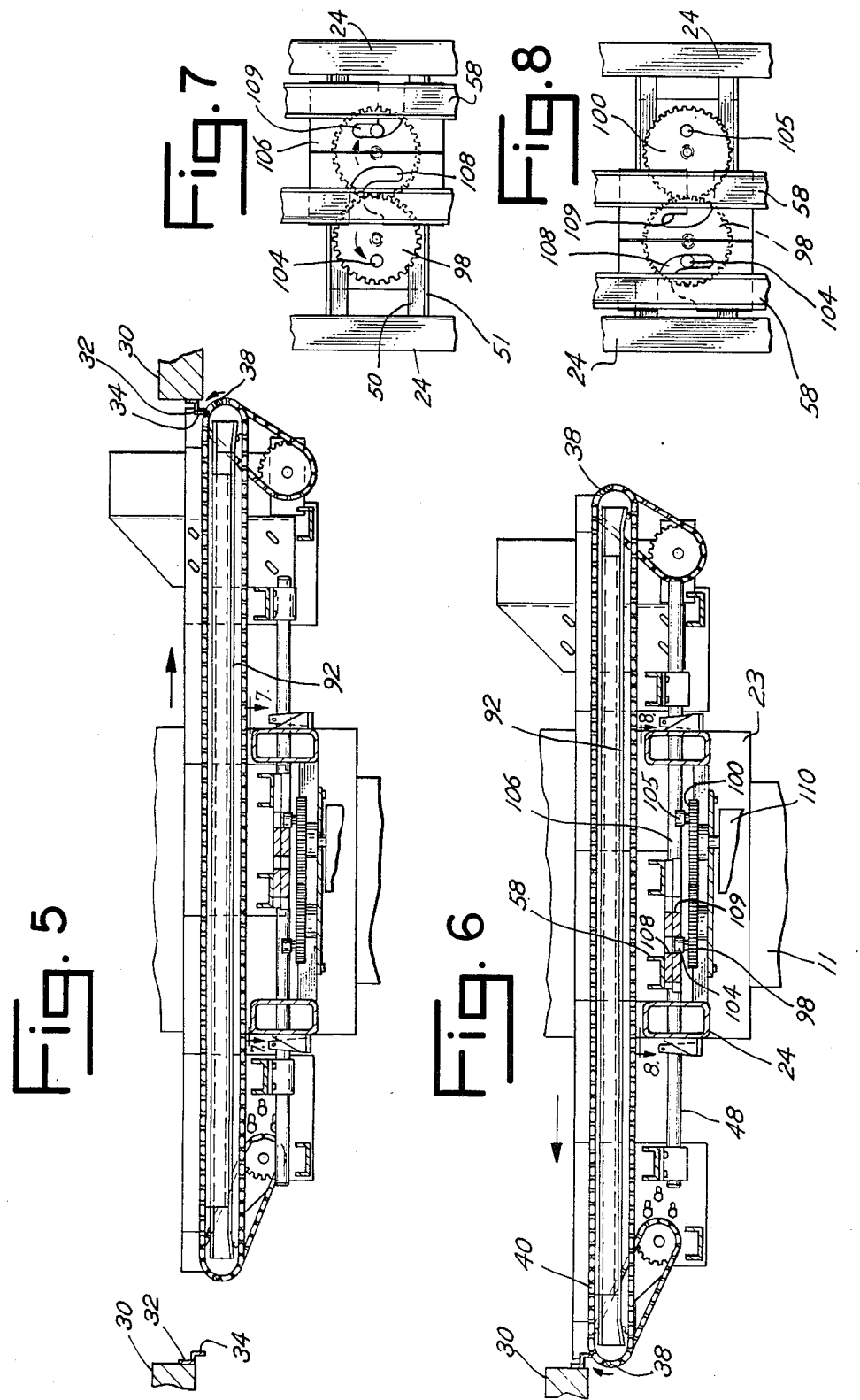

4,756,657

STACKER BIN SHUTTLE

BACKGROUND OF THE INVENTION

This invention relates generally to a system for handling storage and inventory control of small parts stored in drawer-like containers and more particularly to a shuttle mechanism for automatically moving said containers into and out of bins or slots in storage racks. Storage and retrieval systems are well known and comprise storage racks for parts being stored on either side of a central aisle. A stacker crane, controlled by an operator through a keyboard, travels the aisle to retrieve and store parts on pallets or in containers lodged in the racks.

U.S. Pat. No. 3,756,433 discloses a shuttle assembly on a stacker crane for moving a cage-like material carrier, suspended from a track or rail, from the transfer rail on the crane to the rail on the storage rack or vice versa. Because the containers run on a rail, it is necessary accurately to align the rail on the crane horizontally and vertically with the rail on the storage rack. This system is rather complex and is not adapted for handling small parts.

U.S. Pat. No. 3,762,531 discloses a shuttle for sliding a flat-sided load from an elevating platform mounted on a load stacker to a bin in a storage rack adjacent the stacker. The shuttle is in the nature of a yoke suspended from a carriage that moves between the elevating platform and the bin. The yoke has side plates disposed at the sides of the load which plates terminate above the platform or floor upon which the load rests. Pusher bars extend between the side plates and are adapted to bear against the end of the load. The yoke moves to and from the adjacent bin to "scrape" the load off the elevating platform and onto the floor of the bin, or vice versa. The pusher bars are mounted on conveyor chains trained on sprockets mounted on the side plates. The pusher bars can be moved from one end of the load to the other by the moving chains. Thus, the load can be pushed toward or away from the bin. The pusher bars cannot pull the load and consequently, must be movable into pushing position at one end or the other of the load.

U.S. Pat. No. 3,921,828 shows a stacker crane and an adjacent storage rack equipped with roller conveyors over which the load travels on a pallet as it moves on and off the storage shelf. The elevator platform also has rollers for supporting the load. A hook is used to pull the pallet from the storage shelf to the stacker crane. Essentially, the load on a pallet is pushed around the conveyors.

SUMMARY OF THE INVENTION

Unlike the prior art, the present invention is specially adapted to handle small parts, small tools, and documents. The parts are disposed in box-like drawers which slide into openings in the storage racks adjacent the aisle traveled by a stacker crane. The slots or bins which receive the drawers are arranged vertically in stacks disposed adjacent each other along the aisle in which the crane travels. The entire system is enclosed to maintain security, integrity and cleanliness. A computer-controlled stacker crane equipped with a shuttle locates, extracts, and delivers the container-drawers from either the right or left side of the aisle to keep a constant source of parts and tools flowing to plant production. The container drawers have at either end a handle extending from side to side which includes a flange to facilitate pushing the container drawer into a storage slot or pulling it out of a storage slot.

A carriage is mounted for longitudinal movement on the elevator of a stacker crane and carries a rod adapted to engage the flange on the container drawer to move the drawer in and out of the storage rack. The rod is mounted on a pair of chains trained on sprockets at opposed sides of the carriage. Drive means is provided for moving the carriage back and forth into and out of contact with the storage rack at the level where the drawer enters the slot or bin in the rack. As the chains move on the sprockets, the extractor rod engages the flange on the drawer and, depending upon the direction the chains are moving, either pulls the drawer out or pushes it into its slot. The container drawer slides on suitable supports in the rack and on the carriage.

In one form of the invention, the carriage carrying the extractor mechanism slides on rods toward and away from the storage bins. A cam mechanism is used to accurately control the distance the carriage moves from the stacker to the storage rack.

The shuttle mechanism preferably has two rods, one at each end of the carriage to serve racks on either the left or right side of the aisle.

THE DRAWINGS

These and other advantages of the invention will become apparent from the following description when read in connection with the accompanying drawings in which:

FIG. 5 is a view similar to FIG. 4 which shows the carriage of the shuttle moved to the right to engage the handle on the end of the container drawer on that side of the aisle.

FIG. 6 is a view similar to FIG. 4 showing the position of the parts when the carriage is moved to engage the handle of a drawer on the left side of the aisle.

FIG. 7 is a sectional view taken along line 7—7 of FIG. 5.

FIG. 8 is a sectional view taken along the line 8—8 of FIG. 6.

DETAILED DESCRIPTION

Figure 1:
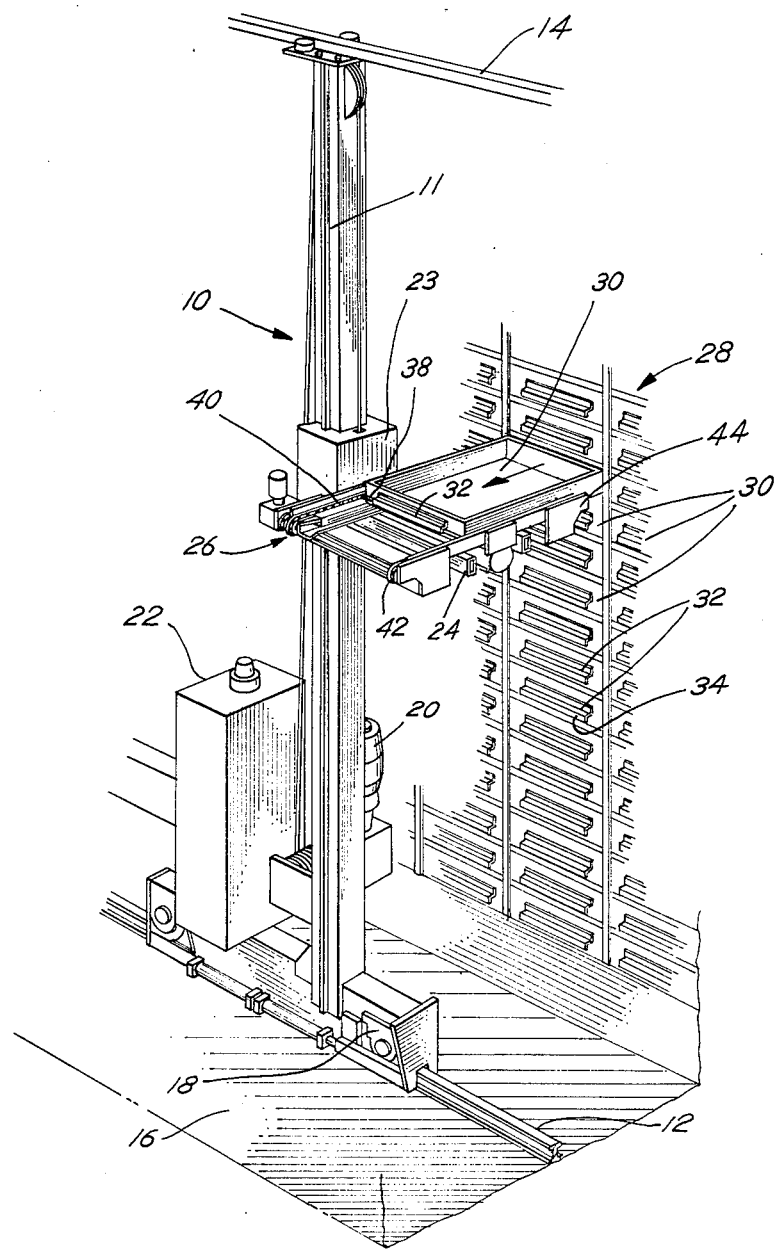
FIG. 1 is a perspective view of a stacker crane, an adjacent storage rack containing the drawers for small parts and a shuttle mechanism mounted on an elevator on the crane.

A general assembly of the apparatus of the invention is shown in FIG. 1. A stacker crane 10 of conventional construction runs on a top rail 14 and floor rail 12 anchored to the floor 16. The crane has a conventional mast 11 and an elevator 23 which rides up and down on the mast powered by hoist drive 20. Projecting outwardly from the elevator 23 and rigidly fixed thereto are a pair of box beams 24 in the nature of arms which provide a frame support for the shuttle or extractor 26. The stacker crane 10, moved by a drive means 18, travels in an aisle disposed between two storage racks 28, only one of which is shown in FIG. 1. Container drawers 30 holding the parts are slidably mounted in slots in the racks and are arranged vertically in stacks disposed adjacent each other along the aisle. Each container drawer has an elongated handle 32, including a downwardly turned flange 34 which facilitates gripping the handle to move the drawer in or out of the rack. The racks are modular and may be assembled in heights up to 40 feet and of any desired length. The container drawers may be formed of steel, e.g., 18 inches by 36 inches and vary in height from 4 inches to 12 inches.

A control cabinet 22 is mounted on the lower portion of the stacker crane. A vertical code reader is provided in the elevator 23 and a horizontal code reader is provided in the lower portion of the stacker crane assembly for control purposes. The positioning system for the stacker crane and the elevator do not comprise part of this invention and are not, therefore, disclosed in detail in this specification. Any conventional computer controlled system can be used.

Figure 2:
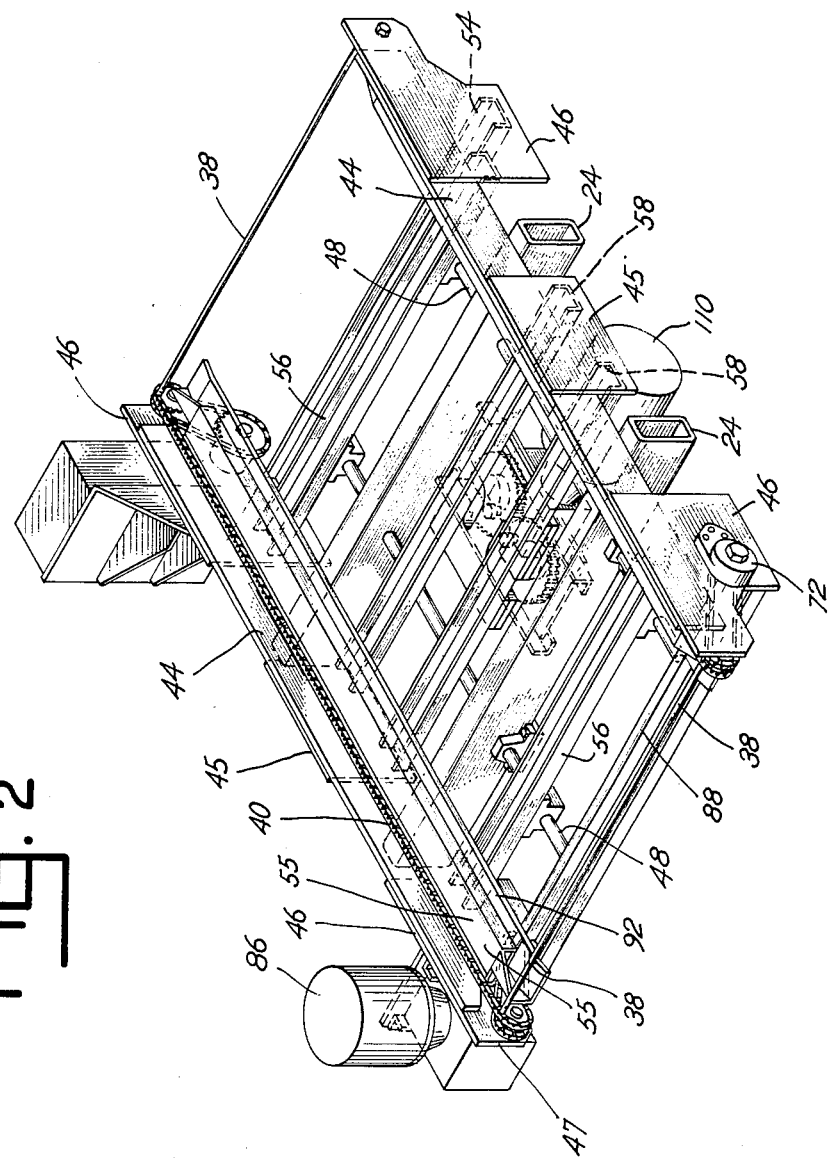
FIG. 2 is a perspective enlarged view of the shuttle mechanism showing further details of its construction.
Figure 3:
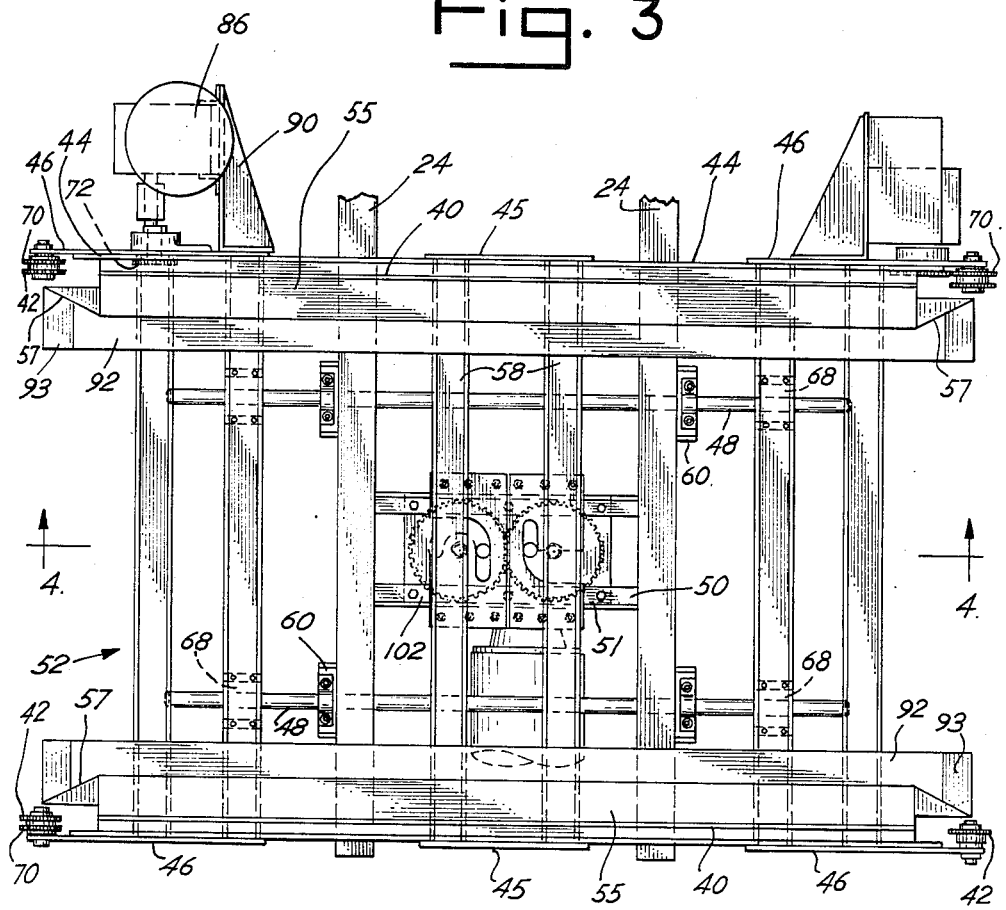
FIG. 3 is a plan view of the shuttle mechanism.
Figure 4:
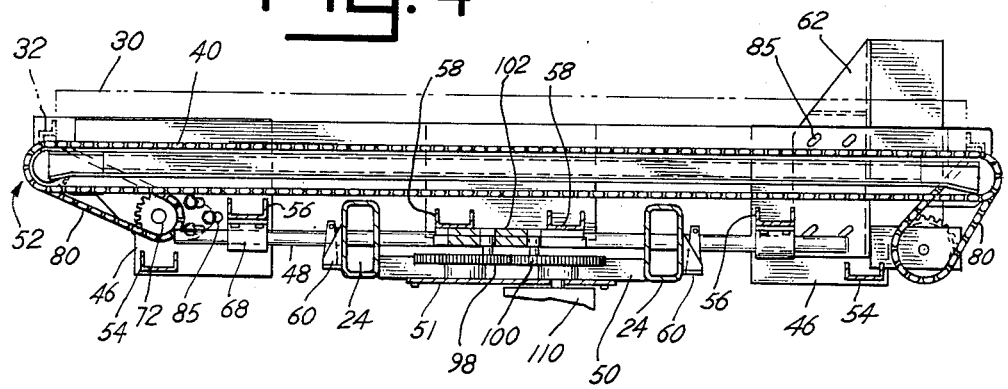
FIG. 4 is a sectional view through the shuttle mechanism taken along the line 4—4 of FIG. 3.

Referring to FIGS. 2-4, which show the details of the shuttle mechanism for moving the drawers in and out of the storage rack, the frame of the mechanism consists of two box beams 24 which extend out from the elevator 23 on the stacker crane and a pair of longitudinally extending rods 48 which are secured to the beams 24. The rods 48 extend through the beams 24 and are clamped by means of clamps 60 to prevent movement of the rods relative to the beams. Thus, the beams 24 and rods 48 are fixed to the elevator 23.

The carriage 52 of the shuttle mechanism 26 is mounted for longitudinal movement on the rods 48 by means of bearings 68 which are secured to a pair of channel beams 56. The channel beams 56 are welded at their ends to side plates 46. The carriage 52 has two additional pairs of channel beams 54 and 58 which likewise extend across the carriage and are welded to side plates 46 and 45, respectively. The three pairs of opposed side plates 46, 45, 46 are welded to opposed plates 44 which run the entire length of the carriage near the top thereof. Longitudinal flanges 92, one on either side of the carriage are secured to the side plates 44 and serve to support the container drawer 30 when it is removed from the storage rack onto the carriage. Longitudinal tubular stringers 55 are secured to the flanges 92 and serve to center the drawer 30 so it remains on flange supports 92 and to space the drawer from the chains 40, guide members 57 at the ends of stringers 55 serve to urge the drawer toward the center of the carriage if it is off center upon entering the carriage. Likewise, flanges 92 are inclined slightly downward at their ends 93 for the same reason.

A pair of extractor rods 38 (FIG. 2) are attached at their ends to chains 40 which are trained on revolving sprockets mounted at the sides of the carriage. When the carriage is positioned adjacent one of the drawers 30 in rack 28, the rod moves under the handle 32 behind flange 34 as the chains advance the rod. The handles 32 extend almost to the sides of the container drawers and may be one or two feet long. Rod 38 extends beyond the ends of the handle. Thus, the drawer moves in a straight line when pulled or pushed by the extractor rod since the extensive engagement with the rod prevents cocking. In their normal positions, just prior to engagement with a handle, the rods are located at opposite ends of the carriage and will engage drawers on the right or left side of the aisle.

The chains 40 are trained on sprockets 42 mounted on side plates 46 at the four corners of the carriage. As best shown in FIG. 4, the sprockets 42 are driven by sprockets 70 connected to motor/gear box 86 through a chain 80 and driven sprocket 72. Sprocket 72 is adjustably mounted on side plate 46 by bolts in slots 85 (FIG. 4) to permit tightening or loosening the drive chain 80. Sprocket 72 is fixed to shaft 88 which turns another sprocket 72 at the opposite side of the carriage to drive the chain 40 on that side in the same manner.

To bring the extractor rod 38 to engagement with the handle 32 of one of the container drawers 30, it is necessary to move the carriage longitudinally into contact with the storage rack 28. This is done by means of a cam mechanism which moves the carriage 52 on the rods 48 comprising part of the frame of the shuttle mechanism. The parts are best shown in FIGS. 5-8. A cam plate 106 having cam slots 108, 109 is rigidly secured to the underside of channel beams 58 so that when plate 106 moves the entire carriage moves. Cam followers 104, 105 project upwardly from the surface of gear disks 98 and 100, respectively, which gears are in meshing rotation so that they turn in opposite directions when driven. The cam followers work alternatively with slots 104, 105 depending upon the direction the carriage is to be moved as explained below. A motor and gear box 110 drives gear 100.

OPERATION

Let us assume it is desired to remove a particular container drawer 30 from the rack 28. The operator actuates the circuit for that drawer and the computer directs the code readers to advance to the stacker crane along the aisle to a point opposite the correct stack of drawers and to raise the elevator 23 to the correct elevation for aligning the extractor rod 38 with the handle 32 of the desired drawer. When the correct positions are reached, the computer is programmed to actuate the motor 110 and cause the gear 100 to rotate in a clockwise direction (FIG. 7) within slot 109 of cam plate 106. The cam follower moves to the right in FIG. 7 moving the cam plate in that direction and the entire carriage with it. The carriage is now in the position shown in FIGS. 5 and 7. The cam follow 104 on gear 98 moves in the opposite direction and exits from the slot 108 as the carriage moves to the right. In this position the carriage is aligned with the desired drawer with the rod 38 directly beneath handle 32. The motor 86 is then actuated to drive the chain 40 in the counterclockwise direction (arrow FIG. 5). The rod 38 moves upwardly behind th flange 34 of the handle 30. The rod bears against the handle along its entire length. The chain continues to move to the left pulling the drawer 30 onto the flanges 92. The contacting portions of the drawer may be waxed and may be equipped with plastic buttons so that the drawer slides easily on the flanges. When the drawer is centered on the carriage, the motor 86 stops, and the carriage backs away from the storage rack 28. This is accomplished by reversing the motor 110 to cause the gear 100 to rotate counterclockwise. The motor stops when the cam followers 104, 105 are closest to each other with the carriage at midpoint. The stacker crane then moves to the point where the container drawer holding the desired parts is discharged.

If it is desired to retrieve a drawer from the rack on the left side of the aisle, the operation is repeated, the computer being programmed to perform the operations on the opposite side. In such case, the carriage is moved by actuating motor 110 (in same direction) thus causing follower 105 to move out of slot 109 and follower 104 to move into slot 108. As gear 98 rotates counterclockwise, the cam plate 106 moves to the left and with it the entire carriage. The parts are then in the positions shown in FIGS. 6 and 8. The sequence of the following operations is as explained above.

The shuttle mechanism can be operated to deliver the container drawers back into their slots in the storage rack by reversing the sequence of operations. The computer is programmed to do this. After the stacker crane is in the proper position, the carriage moves into contact with the rack, the chains moving the extractor rod are moved in the direction toward the rack and the rod pushes against the handle 32 instead of pulling on the flange 34.

What is claimed is:

1. A shuttle mechanism for transferring containers to and from storage racks comprising
   a frame,
   a carriage mounted for longitudinal movement on said frame,
   a container supporting bed on said carriage,
   a pair of endless chains extending longitudinally of said carriage mounted on sprockets at the sides of said carriage,
   a rod extending across said carriage connected at its ends to said chains,
   actuating means on said carriage for driving said chains in forward and reverse directions,
   said carriage including
      a pair of side plates,
      a beam member extending across said carriage between carriage side plates,
      a cam plate secured to said beam member,
      a curved slot in said cam plate,
      a disk mounted for rotation on said frame,
      a cam follower projecting from the face of said disk into the slot of said cam plate, and
      means for rotating said disk in a forward and reverse direction, thereby moving said carriage back and forth on said frame.

2. The mechanism of claim 1 in which said cam plate contains a pair of curved slots and said disk is replaced by a pair of meshed gears each of which has a cam follower projecting into one of said curved slots.

3. A storage and retrieval system for small parts comprising
   a storage rack having rows of vertically disposed containers, each said container having a handle extending across the end thereof, disposed above the bottom of said container,
   a stacker crane including a mast mounted for movement along the face of said storage rack,
   an elevator on said mast,
   a shuttle device for moving said container from said rack to said elevator and from said elevator to said rack,
   said shuttle device comprising
      a frame mounted on said elevator,
      a carriage mounted on said frame for longitudinal movement into and out of engagement with said containers,
      a container-supporting bed on said carriage,
      opposed plates at the sides of said carriage, rising above said bed,
      a pair of chains trained on sprockets on said opposed side plates, the upper reach of said chains extending above said container-supporting bed a distance equal to the distance between said handle and the bottom of said container,
      an extractor rod extending laterally of said carriage having its ends secured to said chains for engaging said handle when said carriage is positioned adjacent said container, drive means on said frame for said sprockets, and
      cam means on said carriage for controlling said longitudinal movement.

4. The shuttle device in claim 3 wherein said frame comprises two shafts and bearings slidably mounted on said shafts, said carriage being secured to said bearings.

5. The storage rack of claim 3 having rows of vertically-disposed containers on either side of said stacker crane in which said shuttle device has two extractor rods, one at each end of said carriage to serve containers on either side of said stacker crane.

6. The shuttle device in claim 3 in which the distance of longitudinal movement of said carriage is sufficient to bring said rod into engagement with said handle.

7. The shuttle device in claim 3 in which said container-supporting bed comprises a pair of flanges extending inwardly from said side plates.

8. The shuttle device of claim 7 which includes longitudinal stringers inside said side plates to center said containers on said flanges.

9. The shuttle device of claim 8 having spaced storage racks housing said containers on either side of an aisle in which said stacker crane travels, and in which said carriage has two extractor rods, one at each end of said carriage for engaging containers on either side of said aisle.

* * * * *